CONTINUOUS ANTENNA SELECTION SYSTEM
Filed Dec. 27, 1965
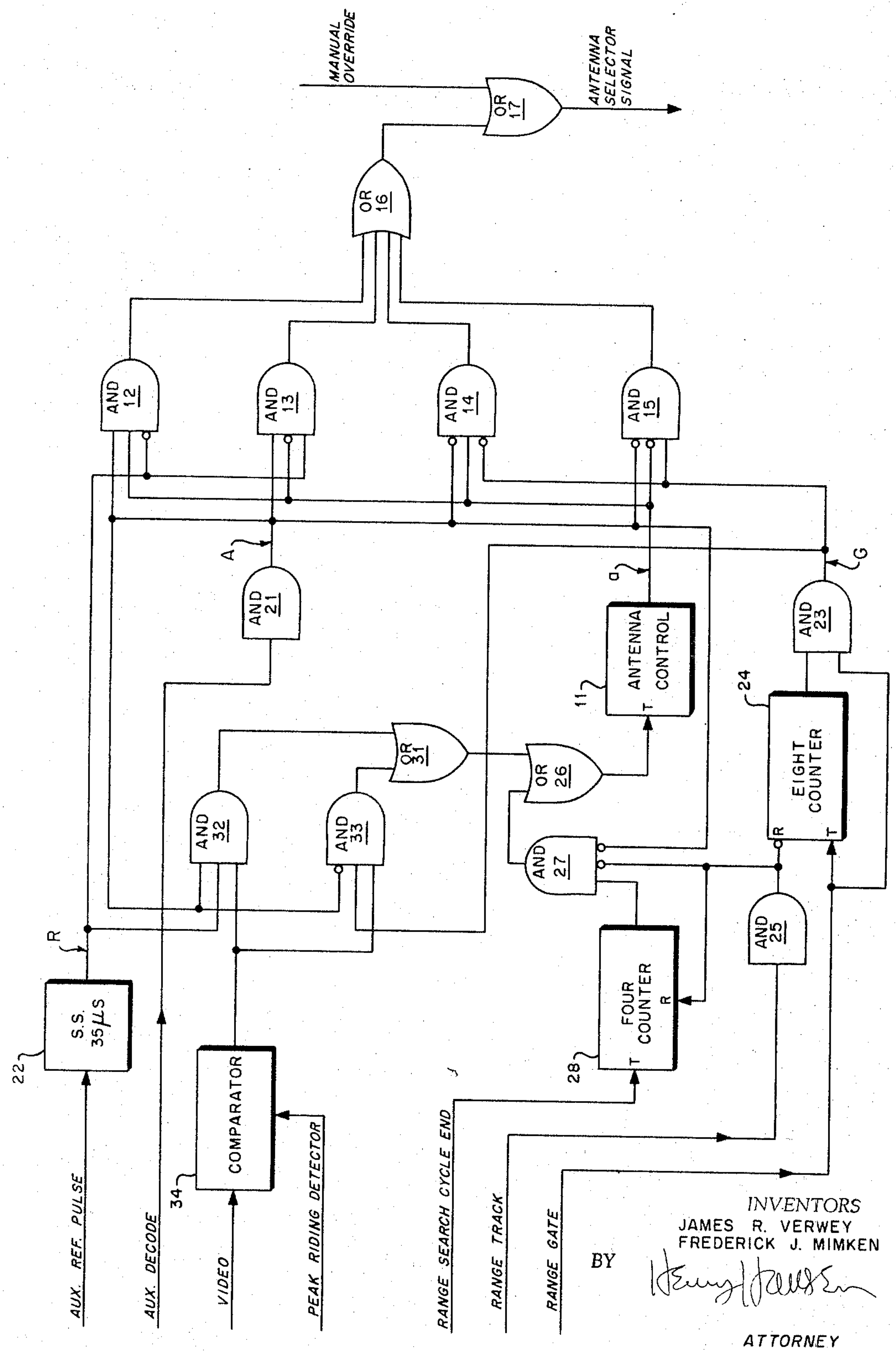
INVENTORS
JAMES R. VERWEY
FREDERICK J. MIMKEN
BY Henry Hansen
ATTORNEY United States Patent Office 3,368,151

Patented Feb. 6, 1968

3,368,151

CONTINUOUS ANTENNA SELECTION SYSTEM

James R. Verwey, Rochester, and Frederick J. Mimken, Fairport, N.Y., assignors, by mesne assignments, to the United States of America as represented by the Secretary of the Navy Filed Dec. 27, 1965, Ser. No. 516,791
9 Claims. (Cl. 325—370)

ABSTRACT OF THE DISCLOSURE

An antenna selection system in a multi-antenna system which maintains a substantially constant check on the strength of the signals received from each antenna and always selects the antenna which is receiving the strongest signal at any given point. Three modes of the system are described: in the first mode, the antennas are sequentially sampled at predetermined time intervals; in the second mode the system will stay with one antenna which first received signal information and remain with that antenna for a predetermined time interval after which another antenna is selected and the strength of the signals again compared. If the strength of the other signal is greater than the first, the system will switch over to the other antenna, otherwise it will remain with the first. The third mode of operation causes the system to switch antennas for small intervals of time during which the strength of one signal is compared with the strength of the previously received signal.

The present invention relates to communications receivers and more particularly to an antenna selection system in a TACAN navigation set or the like.

In the field of communications receivers the problem has arisen with respect to the orientation of the antenna so as to receive a maximum signal. Some antennas are designed to receive equally from all directions. This unfortunately does not produce particularly good reception in any direction. In some systems a plurality of differently oriented antennas are provided and the system cycles continuously through the antennas so as to produce a maximum signal in some portion of the cycle. This unfortunately means that the signal will be degraded for a large portion of the cycle. Some systems allow the operator to select manually the antennas receiving the best signal. Unfortunately if the communications set is in an aircraft, as for example for a TACAN navigation set, the aircraft may go through several different orientations with respect to the transmitting equipment with the result that repeated changes in the selection of the antenna must be made. Some systems lock on the first usable signal, and reinitiate a search only when the signal becomes unusuable. This means the best signal is received only one half the time in a two antenna system, and even less in a multi-antenna system. Other antenna selection systems rely on phase detectors to determine the direction from which the signal is being received and then either orient the antenna or select the antenna which will receive the optimum signal from that direction. Such systems require either mechanical means to orient the antenna or fairly complicated phase detectors having problems of their own.

The general purpose of this invention is to provide an antenna selection system for a TACAN navigation set or the like which maintains a substantially continuous check on the strength of the signal received from each antenna and always selects the antenna which is receiving the strongest signal at any given point. To attain this the present invention contemplates a selection system hav- three modes. In mode I the antennas are sequentially selected for predetermined periods of time until range tracking signals are received. When this happens the system switches into mode II, in which the system will stay on the antenna which first received the range tracking signals until the eighth range gate is reached, whereupon the selection system will switch to another antenna for one range gate pulse. The strength of the signal during that pulse is compared with the strength of signals received in previous pulses and if it is stronger the system will switch over to the second antenna. When auxiliary reference pulses are received the system switches to mode III, in which each received auxiliary reference pulse causes the system to switch antennas for a small period of time, comparing one pulse to the strength of previously received pulses. Again, if that one pulse from the second antenna is stronger the system will be switched to the second antenna. As a general rule, once the system is synchronized the antenna switching system will ride continuously in mode III.

Accordingly, it is an object of the present invention to provide an antenna selection system in a communications receiver wherein the antennas are switched periodically when no signal is being received.

Another object of the invention is to provide an antenna selection system in a TACAN navigation set wherein the receiver will ride on one antenna and switch to the other antenna at periodic intervals.

A further object of the invention is the provision of an antenna selection system in a TACAN navigation set wherein the receiver rides on one antenna receiving the stronger signal and switches to the other antennas for a predetermined time interval at each auxiliary reference pulse in order that the relative signals received by the two antennas may be compared and the set placed on the antenna receiving the stronger signals.

Other objects and many of the attendant advantages of this invention will be readily appreciated as the same becomes better understood by reference to the following detailed description when considered in connection with the accompanying drawing wherein:

The figure shows the block schematic diagram of the antenna selection system according to the invention.

Referring now to the drawing there is shown an antenna control flip-flop 11 the output "*a*" of which may be either "1" or "0" depending on its condition. Its output feeds into four AND gates 12, 13, 14, 15, the outputs of which are fed into an OR gate 16. The output of the OR gate 16 is connected to OR gate 17 having an output to the antenna selector switch. OR gate 17 may also receive a manual override signal as shown. If the output from gate 17 is a "1" the antenna selector switch will activate one antenna. If the output of gate 17 is a "0" the antenna selector switch will select the other antenna. The antenna selector switch is not shown, as it is of a common solid-state construction well known in the art.

Gates 12, 13, 14 and 15 also receive an auxiliary decode signal A from an AND gate 21 which is activated by a continuing signal indicating the reception of auxiliary reference pulses. Gates 12 and 13 also receive enabling or disabling signals R from a 35 microsecond single shot 22. AND gates 14 and 15 receive a range signal G from an AND gate 23. AND gate 23 is enabled by the combination of a range gate pulse and the eighth count of an eight counter 24. Range gate pulses are generated in the TACAN receiver for a period in which a reception pulse is expected. Eight counter 24 will count up the received range gate pulses and on the eighth one AND gate 23 will be enabled. Eight counter 24 is permitted to count up by a positive output from an AND gate 25 which is activated by a continuing signal indicating reception of range track pulses. When no range track pulses are received the "0" output from AND gate 25 will cause eight counter 24 to be continually reset thereby inhibiting AND gate 23. Antenna control flip-flop 11 is triggered by an output from OR gate 26. OR gate 26 may be activated by the output from AND gate 27 which is enabled by the fourth count on a four counter 28. Four counter 28 receives and counts pulses indicating the end of each range search cycle. These are generated internally by the TACAN receiver in somewhat the same manner as the range gate pulses triggering eight counter 24. The circuits necessary to generate these signals are not shown as they are not relevant to the present invention.

OR gate 26 may also be activated by an output from OR gate 31 which in turn may be activated either by AND gate 32 or AND gate 33. AND gate 32 or 33 may receive signals from a comparator 34 which compares the instantaneous video signal received with the signal on a peak riding detector. The peak riding detector is not shown as the details of it are not relevant to the present invention. It has an AGC circuit with a long RC time constant receiving video pulses. At any given moment the signal on it will be essentially equal to the height of the pulses which have just gone before. AND gates 32 and 33 are enabled or disabled by the output A from AND gate 21. Gate 32 is also enabled by the 35 microsecond pulse from single shot 22. AND gate 33 is also enabled by the output G from AND gate 23. AND gate 27 also may be disabled by a "1" output from either AND gate 21 or AND gate 25.

The operation of the antenna selection system is as follows: At the start of the operation it may be presumed that neither the range track nor the auxiliary reference pulses are being received. In this case the output of gates 21 and 25 will be "0," the combination of which will enable gate 27 to go to "1" whenever the output of four counter 28 is "1." At the same time the "0" output from gate 25 will inhibit eight counter 24 by continually resetting it. Each time a range search cycle comes to an end it will trigger the four counter 28 and advance it one. At each fourth count gate 27 will be enabled, which will reverse the condition of antenna control flip-flop 11. Gates 12 and 13, whose activating requirements are, respectively, $\overline{AaR}$ and $\overline{AaR}$, will be continually disabled during mode I, as will gate 15, whose activating requirement is $\overline{AaG}$, due to the "0" output from gate 23. When flip-flop 11 is "1" gate 14 will be "1." When flip-flop 11 is "0" gate 14 will be "0." The consequent "1" or "0" of gate 17 will determine which antenna is to be connected.

The selection system will stay in mode I, switching at the end of every four range search cycles from one antenna to the other, so long as no range track signals and no auxiliary reference pulses are received. The length of a range search cycle may be a fixed period of time or it may be variable depending on the signal environment. There are other circuits in a TACAN set capable of analyzing the noise and interference pulses and varying the range search cycle for optimum performance. However, these circuits are not part of the present invention and for purposes of this invention it may be presumed that the range search cycle is more or less of a predetermined period.

It may generally be presumed in an adverse signal environment that range lock on will occur before the auxiliary reference pulses are received. In this case the selection system will switch into mode II. A range track signal is generated indicating that range information is tracking. This will activate gate 25 and cause it to stay continuously on "1." This continuing "1" will disable gate 27 and will also lock four counter 28 on reset. At the same time the continuing "1" will disable the reset of eight counter 24 thereby enabling counter 24 to count the range gate pulses. When range information is being received the equipment will generate range gate pulses in the period in which received pulses are expected. At each eighth range gate pulse, gate 23 will be enabled during the period of the range gate pulse itself. This will either enable or disable gate 17 depending on the condition of flip-flop 11. If gate 14 was previously on "1," it will be disabled. If it was previously on "0," gate 15 will be enabled by the signal from gate 23. This will cause the system to switch from whichever antenna was on to the other one. During this period also a signal is fed to gate 33 to enable it to take the output from comparator 34. Comparator 34 is now receiving the signal from the previously nonselected antenna. The signal from the peak riding detector, on the other hand, reflects the continuing strength level received from the selected antenna. Comparator 34 will compare the strength of the signal received from the previously nonselected antenna with the strength of the signal from the previously selected antenna and will give an output if the signal from the video is higher than the peak riding detector. If there is an output from comparator 34 this pulse will travel through gate 33, gate 31, and gate 26 to trigger flip-flop 11 and reverse it. Whichever the previous condition of flip-flop 11 this will have the effect of reversing the selection of the antenna. The system will in this event continue as before except that the antenna now selected for the first seven range gate pulses is opposite to the one previously selected. Of course, if the strength of the signal on the peak riding detector is higher there will be no output from comparator 34 and the selection of the antenna will not change. By this means then a sampling is provided on every eighth range gate pulse of the nonselected antenna to compare it with the previously selected antenna. When the equipment begins to decode auxiliary reference pulses there will be a "1" signal on the input of gate 21 and a "1" output at point A. This will disable gates 14 and 15 and enable gates 12 and 13. This will also disable gate 33 and enable gate 32, as well as disabling gate 27. The same will occur if the auxiliary reference pulses are received before the range track, and the selection system goes directly from mode I to mode III. In either case the selection of the antenna will be determined by the combination of signals into gates 12 and 13. Since the output of single shot 22 is ordinarily "0" gate 13 will ordinarily be disabled and the condition of the signal "*a*" into gate 12 will determine which antenna is selected. As each auxiliary reference pulse comes into single shot 22 a 35 microsecond pulse R is generated disabling gate 12 and enabling gate 13. The selection of antenna, whichever it was, will then be reversed for the period of the 35 microsecond pulse. This is just long enough to allow comparator 34 to compare the next received pulse with the continuing signal of the peak riding detector. This time if there is an output from comparator 34 gates 32 will be enabled to reverse the condition of flip-flop 11 through OR gates 31 and 26. This will again have the effect of reversing the selection of the antenna. Again if there is no output from comparator 34 the selection of the antenna will not change.

The sequence of the three modes then proceeds as follows. In mode I no signals are received and the antenna selection system switches from one antenna to the other every four range search cycles. When range track information is received mode II is initiated, in which the system stays on the one antenna for seven range gates and switches to the other one on the eighth gate pulse for comparison purposed. If the signal from the other is stronger the system will switch. Otherwise it will return to the first antenna. When auxiliary reference pulses are being received the system will switch into mode III, which overrides mode I and mode II. In mode III at each auxiliary reference pulse the system switches antennas for 35 microseconds. Again if the signal received is stronger than before the antenna system will switch. Otherwise, it will stay on the first selected antenna. By this means it will be seen that a continuous monitoring and selection of antennas is provided, thereby adapting the system to changing conditions such as in an aircraft which may be continually changing its attitude with respect to the transmitting set. This offers significant advantages over antenna selection systems which merely select the first antenna to receive a usable signal.

It will be seen also that the system is adaptable to systems with more than two antennas. In such systems there would be substituted for flip-flop 11 a multistable storage element having as many stable states as there are antennas in the receiving set. Appropriate logic circuits would be provided dependent upon the condition of the multistable storage element to select the antenna then receiving the strongest signal.

Gates 12 through 16 form a logic matrix determining the selection of the antenna by the combination of the input signals to them.

Obviously many modifications and variations of the present invention are possible in the light of the above teachings. It is therefore to be understood that within the scope of the appended claims the invention may be practiced otherwise than as specifically described.

We claim:

1. An antenna selection system for communications receiver having at least two antennas of different orientations comprising:
   - a storage element having as many stable states as there are antennas;
   - means to select an antenna controlled by the state of said storage element, said means including:
     - first means to receive a first series of pulses representing information;
     - a logic matrix determining the selection of an antenna by the combination of the state of said storage element and the state of said first receiving means;
     - a second means to receive a second series of pulses representing information and to issue an output pulse of a predetermined period at each of said second series of pulses;
     - means to receive a continuing signal indicating reception of said second series of pulses, said first means to receive said first series of pulses being inhibited by the reception of said continuing signal, said logic matrix determining the selection of an antenna by the combination of the state of said storage element and said second receiving means upon the inhibition of said first receiving means;
   - means to compare periodically the signal received by the said selected antenna with that received by another antenna and to issue an output signal when said antenna is receiving a stronger signal; and
   - means in response to said output signal to alter the state of said storage element.

2. An antenna selection system as recited in claim 1 further comprising:
   - means actuated in the absence of both said first and said second series of pulses to reverse periodically the state of said storage element.

3. An antenna selection system as recited in claim 2 wherein said actuated means comprises:
   - a counter receiving pulses representing the passage of a predetermined time, said counter at a predetermined count sending a signal to reverse the state of said storage element.

4. An antenna selection system as recited in claim 2 wherein said actuated means comprises:
   - a counter receiving pulses representing the passage of a predetermined time; and
   - an AND gate receiving the output of said counter, the output of said AND gate when enabled reversing the state of said storage element, said AND gate being inhibited by reception of either of said first or said second series of pulses.

5. An antenna selection system for a communications receiver having at least two antennas of different orientations comprising:
   - a storage element having as many stable states as there are antennas;
   - means to select an antenna controlled by the state of said storage element;
   - means to compare periodically the signal received by said selected antenna with that received by another antenna and to issue an output signal when said other antenna is receiving a stronger signal;
   - means in response to said output signal to alter the state of said storage element;
   - first means adapted to receive a first series of pulses representing the passage of a predetermined time to provide a first signal to reverse the state of said storage elemnt after a predetermined number of said first series of pulses;
   - second means adapted to receive a second series of pulses representing information to provide a second signal of a predetermined period at each of said second series of pulses;
   - third means adapted to receive a continuing signal indicating the presence of said second series of pulses to inhibit said first means from providing said first signal;
   - said means to select determining the selection of an antenna by the combination of the state of said storage element and said second signal.

6. An antenna selection system as recited in claim 5 further comprising:
   - fourth means adapted to receive a third series of pulses to reverse periodically the state of said storage element in the absence of both said first and second series of pulses.

7. An antenna selection system as recited in claim 6 wherein said first means comprises:
   - a first counter providing said first signal after a predetermined count of said first series of pulses; and
   - said second means comprises:
     - a one-shot multivibrator providing said second signal after a predetermined count of said second series of pulses.

8. An antenna selection system as recited in claim 7 wherein said fourth means comprises:
   - a second counter receiving said third series of pulses and providing a reversing signal to said storage element after a predetermined number of said third series of pulses.

9. An antenna selection system as recited in claim 8 wherein said means to select comprises:
   - a logic matrix determining the selection of an antenna by the combination of the state of said storage element and said second signal.

References Cited

UNITED STATES PATENTS

| | | | |
|---|---|---|---|
| 2,211,894 | 8/1940 | Heisner | 343—100 |
| 2,729,741 | 1/1956 | Chapman | 325—370 |
| 3,037,113 | 5/1962 | Bier | 325—370 |
| 3,095,538 | 6/1963 | Silbertstein | 325—370 |
| 3,182,263 | 5/1965 | Gossard | 325—370 |

RODNEY D. BENNETT, *Primary Examiner.*

RICHARD A. FARLEY, *Examiner.*

H. C. WAMSLEY, *Assistant Examiner.*